US006250609B1

United States Patent
Cheng et al.

(10) Patent No.: US 6,250,609 B1
(45) Date of Patent: Jun. 26, 2001

(54) METHOD OF MAKING SUPERSATURATED OXYGENATED LIQUID

(75) Inventors: Alan Tat Yan Cheng, Livingston, NJ (US); Timothy Michael Lewis, Spokane; Russell Steve Plancich, Lakewood, both of WA (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/345,099

(22) Filed: Jun. 30, 1999

(51) Int. Cl.[7] ........................................ B01F 3/04
(52) U.S. Cl. ................ 261/34.1; 261/76; 261/140.1; 261/DIG. 78; 426/316; 426/474
(58) Field of Search ................ 261/5, 34.1, 76, 261/77, 121.1, 128, 140.1, DIG. 78; 426/316, 474, 477

(56) References Cited

U.S. PATENT DOCUMENTS

| | | | |
|---|---|---|---|
| 4,027,045 | 5/1977 | Fedotkin et al. | 426/312 |
| 4,141,939 * | 2/1979 | Oshima | 261/DIG. 78 |
| 4,639,340 * | 1/1987 | Garrett | 261/DIG. 78 |
| 4,861,352 | 8/1989 | Cheng . | |
| 4,867,918 | 9/1989 | Kiyonaga et al. | 261/76 |
| 4,931,225 | 6/1990 | Cheng | 261/76 |
| 5,061,406 | 10/1991 | Cheng | 261/76 |
| 5,211,916 | 5/1993 | Cheng | 422/107 |
| 5,302,325 | 4/1994 | Cheng | 261/76 |
| 5,463,176 * | 10/1995 | Eckert | 210/622 |
| 5,997,752 * | 12/1999 | Leu et al. | 210/760 |
| 6,120,008 * | 9/2000 | Littman et al. | 261/76 |

FOREIGN PATENT DOCUMENTS

WO95/29130   11/1995   (WO) .

\* cited by examiner

Primary Examiner—C. Scott Bushey
(74) Attorney, Agent, or Firm—Bernard Lau

(57) ABSTRACT

This invention is directed to a method of making supersaturated oxygenated liquid by introducing a high oxygen content gas to an ozone generator to produce ozone, passing the ozone to a contact tank at atmospheric pressure to produce an oxygenated and ozonated liquid, and passing the oxygenated and ozonated liquid in a contacting loop of an in-line supersonic mixer to produce a substantially pure supersaturated oxygenated and ozonated liquid.

23 Claims, 1 Drawing Sheet

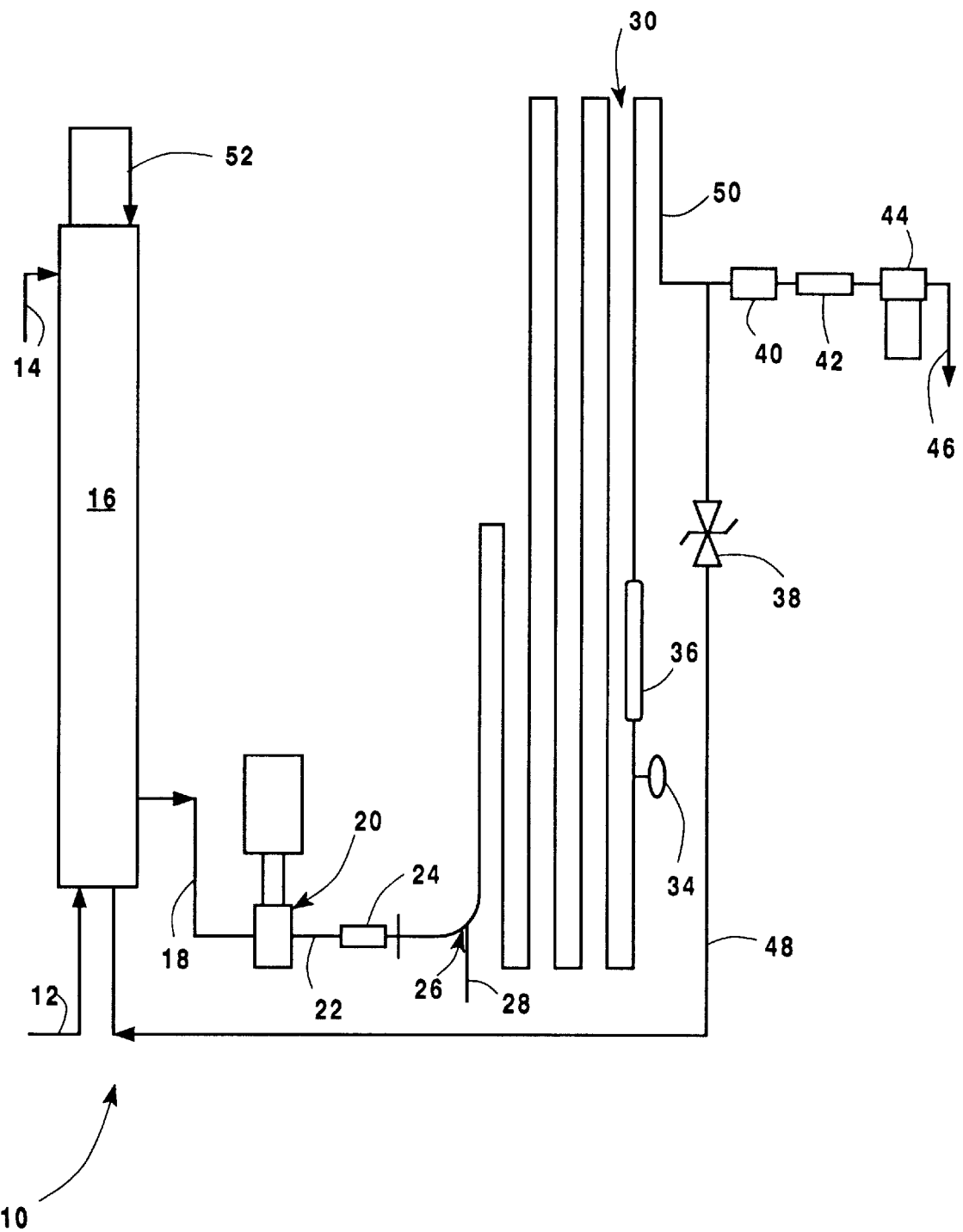

METHOD OF MAKING SUPERSATURATED OXYGENATED LIQUID

FIELD OF THE INVENTION

This invention is generally related to a method for making supersaturated oxygenated liquids. More specifically, this invention is directed to making supersaturated oxygenated water, and maintaining the oxygen in a container.

BACKGROUND OF THE INVENTION

In recent years, consumer demand for sport drinks has increased substantially. Sport drinks, particularly those using oxygenated liquid or even supersaturated oxygenated oxygen, have been gaining in popularity over carbonated soda. Some sport drinks add in minerals to alleviate symptoms of dehydration and to provide an aid to supply glucose for energy production. To provide the necessary oxygenated liquid for the sports drink, it may be necessary to supersaturate liquid, for example mineral water, to a level far exceeding the normal amount of oxygen from air separation. It is also necessary that the liquid be sterilized and sanitized for human consumption.

Work in the art has attempted to increase the equilibrium concentration of the oxygen in the water by lowering the temperature of the water and then pressurizing the oxygen and water in a contacting device using trays, in an effort to drive out the dissolved oxygen to a high equilibrium level. Pure oxygen is used. However, the maximum oxygen concentration has been measured only to about 50 mg/l.

It has been particularly difficult to attain high oxygen concentration in bottled water because prior research has been directed to making "equilibrated oxygen" water, not "supersaturated oxygen" water. Supersaturation, by definition, is an unsteady process in which more oxygen is dissolved than water can receive in equilibrium. If the contacting device can provide sufficient residence time and keep the oxygen gas pure, an equilibrium concentration can be approached, which is about 50 ppm at a chilled water temperature of 5° C.

However, mineral water or any water from natural source contains certain amount of dissolved air. As air contains 79% nitrogen, the pure oxygen used by the prior art will strip out the nitrogen from the air, forming a mixture of less than 100% oxygen. Therefore, the water will be establishing equilibrium with a gas mixture instead of pure oxygen. With heat leaks and pipe friction, chilling and pressurizing the oxygen as in prior arts can only achieve a fraction of the desired equilibrium oxygen concentration.

Furthermore, bacteria removal from the water was carried out generally by reverse osmosis, which also provided an undesirable taste to the water. Ozonation is sometimes used by passing air through an ozone generator. Any unused ozone is vent off from the ozone contacting devices. In general, an adequate oxygen dissolution process and efficient sanitizing process are the results.

It is therefore desirable for a new process to produce supersaturated oxygenated liquid that will retard and prevent bacterial growth.

SUMMARY OF THE INVENTION

One aspect of this invention is directed to a method of making supersaturated oxygenated liquid which comprises introducing a high oxygen content gas to an ozone generator to produce ozone, passing the ozone to a contact tank at atmospheric pressure to produce an oxygenated and ozonated liquid, and passing the oxygenated and ozonated liquid in a contacting loop of an in-line supersonic mixer to produce a substantially pure supersaturated oxygenated and ozonated liquid.

Another aspect of this invention is directed to a method of making a bottled supersaturated oxygenated liquid comprising introducing a high oxygen content gas to an ozone generator to produce ozone, passing the ozone to a contact tank at atmospheric pressure to produce an oxygenated and ozonated liquid, passing the oxygenated and ozonated liquid in a contacting loop of an in-line supersonic mixer to produce a substantially pure supersaturated oxygenated and ozonated liquid, and filling and capping the substantially pure supersaturated oxygenated and ozonated liquid into a bottle. Preferably, the liquid is water.

As used herein, the term "substantially pure supersaturated oxygenated and ozonated liquid" refers to the liquid which has been treated in the contact tank and passed through the mixer of this invention. Generally, the substantially pure supersaturated oxygenated and ozonated liquid has a dissolved oxygen concentration of at least that exiting from the contact tank of from about 30 mg/l to about 50 mg/l, preferably at least 40 mg/l.

DETAILED DESCRIPTION OF THE DRAWING

Other objects, features and advantages will occur to those skilled in the art from the following description of preferred embodiments and the accompanying sole drawing provides a schematic diagram of the process in this invention.

DETAILED DESCRIPTION OF THE INVENTION

This invention provides for a cost effective process to supersaturate liquid, preferably water, with oxygen, and also to provide supersaturated bottled liquid with oxygen and provide sanitation at the same time.

The first step is to eliminate the dissolved nitrogen from the air. This is carried out by combining the sterilization step with ozone and equilibrium stripping at the same time. The air supply to the ozone generator is replaced with pure oxygen, therefore no fresh source of nitrogen, as an inert gas in this instance, is added to the system.

An ozone generator can produce about 10% to about 15% ozone using pure oxygen whereas only about 2% to about 3% ozone may be produced using air.

The ozone generated from pure oxygen is passed to an ozone contactor operating at atmospheric pressure. The ozone acts to destroy the bacteria and remove the odor and harmful organics from the mineral and spring water. The remaining about 85% to 90% balance of oxygen is used as a stripping gas to remove the dissolved nitrogen as the spent gas vent off from the ozone contactor. Operating the ozone contactor at or near atmospheric pressure allows the ozone generating machine to operate efficiently and allow the nitrogen gas to be stripped efficiently.

Refrigeration may be directed to the contact tank. Refrigeration may be in the form of a closed refrigeration loop. It is preferred to chill the contact tank to an equilibrium of from about 3° C. to about 9° C., preferably at about 5° C.

With the ozone and pure oxygen, the liquid exiting from the ozone contact tank will have a dissolved oxygen concentration close to from about 30 mg/l to about 50 mg/l, preferably 40 mg/l. The water exiting from the ozone contactor will also contain dissolved ozone. This dissolved ozone will eventually decompose into oxygen and liquid, providing another source to supersaturate the liquid, on top of the equilibrium level. However, the ozone has only a limited shelf life of several minutes. Therefore, this ozone containing liquid must be supersaturated and bottled as soon as possible. To accomplish this task, it is carried out with an in-line supersonic mixer that requires a residence time in the order of seconds.

To supersaturate the ozonated liquid, oxygen gas is added to the liquid. A pump is used to accelerate the oxygen and ozonated liquid mixture to supersonic speed. In the presence of gas bubbles, the sound velocity reduces from about 5,000 ft/sec (in the liquid) to less than about 50 ft/sec in a supersonic two-phase flow. Upon reducing the velocity, shock waves are formed, breaking the gas bubbles to microscopic sizes. Since the shock wave occurs at about 90 psig pressure, the liquid can reach a supersaturated oxygen concentration of over 80 mg/l, preferably 90 mg/l. A contacting loop allows several seconds of additional contacting time for the microscopic gas bubbles and the liquid.

Upon exiting the contacting loop, the liquid is supersaturated with pure oxygen and dissolved ozone. The supersaturated oxygenated liquid, still containing microscopic oxygen bubbles, is passed immediately to the filler where it is bottled. The supersaturated oxygen will come out of solution as the pressure drops. The pressure may drop to atmospheric as the liquid is filled into the bottles, unless a pressurized filling machine is used. Still, there will be pressure drop on the line to reduce the total pressure. Therefore, it is critical to fill and cap the bottles immediately. The microscopic oxygen bubbles reduce the rate of the oxygen escaping from the solution. It also provides a blanket to the head space of the bottles. As long as the filling and capping can be performed at a higher rate than the oxygen emission rate exiting from the bottle, a supersaturated solution can be captured.

After the bottles are capped, the dissolved ozone will decompose into oxygen and liquid, adding to the supersaturating level of the bottled liquid. The additional oxygen provided by the dissolved ozone will more than compensate for the losses during the last step of the filling and capping operation. It is critical that the last filling and capping steps will be carried out immediately after the supersaturating step.

The spent ozone, with oxygen from the ozone contactor, can be used to flash out the empty bottles before filling. This procedure helps to eliminate air in the bottles as well as to sterilize them.

Another stream of substantially pure oxygenated and ozonated liquid may also be recycled and fed to the bottom of the contact tank.

EXAMPLE

FIG. 1 describes a two stage process to supersaturate water in the ozone contact tank. Schematically, the process was conducted by system 10. Ozone/pure oxygen mixture 12 was added to the bottom of ozone contact tank 16. Water 14 was introduced to the top of contact tank 16. Ozone/oxygenated mixture 18 exiting from the bottom of ozone contact tank 16 passes to seven stage centrifuge pump 20 forming supersaturated oxygenated mixture 22 and then passed to flow meter 24 and stripper 26, and then to orifice plate 30 forming supersaturated oxygenated liquid 50. Supersaturated oxygenated liquid 50 passes through filter 44 before exiting as supersaturated oxygenated liquid 46 for filling. Flow meter 40 and sight glass 42 monitor the flow of supersaturated oxygenated liquid 46 prior to the filling.

Sight glass 36 and pressure gauge 34 monitor the flow of supersaturated liquid in orifice plate 30. Stripper 26 and oxygen 28 were placed in line before orifice plate 30. Bypass valve 38 regulates supersaturated oxygenated liquid 48 and selectively introduce supersaturated oxygenated liquid 48 back to the bottom of contact tank 16. A refrigeration loop 52 provides refrigeration to chill the liquid in contact tank 16.

More generally, the steps included combining the sterilizing steps with ozone and equilibrium stripping at the same time. The air supply to the ozone generator was replaced with pure oxygen, thus preventing any fresh source of nitrogen, an inert, into the system. An ozone generator produced from about 10% to about 15% of the ozone using pure oxygen, as opposed to the production of only about 2% to about 3% ozone in an ozone generator using only air. The ozone generated with pure oxygen was passed to an ozone contactor operating at atmospheric pressure. The ozone destroyed the bacteria and removed the odor and harmful organic from the mineral or spring water. About 85% to about 90% balance of oxygen was used as a stripping gas to remove the dissolved nitrogen as the spent gas vent off from the top of the ozone contactor.

A refrigeration loop on the contact tank chilled the ozonated and oxygenated water therein.

With the ozone and pure oxygen, the water exiting from the ozone contact had a dissolved oxygen concentration of from about 33 mg/l to about 39 mg/l.

The ozone/oxygen saturated water was used to pump out of the ozone contactor using centrifugal pump to increase the pressure of the water to from about 50 psig to about 90 psig. The flow rate was from about 25 gpm to about 75 gpm, depending on the bottle sizes and filling rate of the machines. Oxygen was added downstream of the pump prior to a supersonic mixer. About 180 scf/hr of oxygen was fed to 35 gpm of water. Typically, about 170 scf/hr to about 190 scf/hr of oxygen may be fed to from about 30 gpm to about 40 gpm of water. In the presence of gas bubbles, the sound velocity was reduced to 5,000 ft/sec (in the liquid) to less than 50 ft/sec in a supersonic two-phase flow. Upon reducing the velocity, a shock wave was formed, breaking the gas bubbles down to microscopic sizes. Since the shock wave occurred at about 90 psig pressure, the water reached a supersaturated oxygen concentration of over 90 mg/l.

A 2" contacting loop allowed several seconds of additional contacting time for the microscopic gas bubbles and the water. Five orifice plates of ¾" ID was used at the turn around loops to redistribute the two-phase mixtures.

Upon exiting the contacting loop, the water was supersaturated with pure oxygen and dissolved ozone. The supersaturated oxygenated water, still containing microscopic oxygen bubbles, was passed immediately to the filler where it was bottled. The supersaturated oxygen came out of solution as the pressure dropped. The pressure dropped to atmospheric as the water was filled into the bottles, unless it was a pressurized filling machine. Still, there was pressure drop on the line to reduce the total pressure. Therefore, the bottles were filled and capped immediately. The microscopic oxygen bubbles reduced the rate of the oxygen escaping from the solution. It also provided a blanket to the headspace of the bottles. As long as the filling and capping can be done at a higher rate than the oxygen emission rate from the bottle, a supersaturated solution was captured.

An alternative method for maintaining the ozone and oxygen concentration when filling the bottles with supersaturated oxygenated and ozonated water is by pressure filling the substantially pure oxygenated and ozonated liquid.

Yet another method for providing a high concentration of supersaturated and ozonated water in the bottle is by applying counter pressure to the bottle prior to filling. The lowering of gas pressure in the bottle may be accomplished by using oxygen or ozone to evacuate the content within the bottle prior to filling.

When the filling machine was stopped or the flow rate was reduced, a bypass valve was opened to allow the supersaturated water to recycle back to the ozonation tank. This prevented the lines from being overpressurized. A filter was used to remove any particulate matters. However, the flow meter, sight-glass, and filler were arranged in a compact manner to minimize the distance to the filling machine.

After the bottles were capped, the dissolved ozone will decompose into ozone and water, adding to the supersaturating level of oxygen in the bottled water. The additional oxygen provided by the dissolved ozone will more than compensate for the losses during the last step of the filling and capping operation. It was critical that the last filling and capping steps be carried out immediately after the supersaturating step.

The spent ozone with oxygen from the ozone contactor was used to flash out the empty bottles before filling. This procedure helped eliminate the air in the empty bottle and sterilized the empty bottles.

Another stream of substantially pure oxygenated and ozonated water was recycled into the bottom of the contact tank to provide adequate pressure for the process.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method of making supersaturated oxygenated liquid which comprises
   a) introducing a high oxygen content gas to an ozone generator to produce ozone;
   b) passing said ozone to a contact tank at atmospheric pressure to produce an oxygenated and ozonated liquid; and
   c) passing said oxygenated and ozonated liquid in a contacting loop of an in-line supersonic mixer to produce a substantially pure supersaturated oxygenated and ozonated liquid.

2. The method of claim 1 wherein said high oxygen content gas is pure oxygen.

3. The method of claim 1 which further comprises decomposing said ozonated liquid to oxygen and liquid.

4. The method of claim 3 which comprises adding oxygen to said liquid to supersaturate the ozonated liquid.

5. The method of claim 1 wherein step (c) thereof further comprises passing oxygenated and ozonated liquid mixture in said contacting loop of said in-line supersonic mixer takes place in a centrifugal pump to increase the pressure of the liquid to from about 50 to about 90 psig at a rate of from about 25 to about 75 gallons per minute.

6. The method of claim 1 further comprises adding refrigeration to said contact tank.

7. The method of claim 1 further comprises recycling said substantially pure supersaturated oxygenated and ozonated liquid to said contact tank.

8. The method of claim 1 which comprises accelerating said oxygenated and ozonated liquid to supersonic speed.

9. The method of claim 8 which comprises forming gas bubbles to reduce the sound velocity to less than about 50 ft/sec in a two-phase flow, and further reducing said gas bubbles to microscopic sizes.

10. The method of claim 1 wherein said liquid is water.

11. A method of making a bottled supersaturated oxygenated liquid comprising
    a) introducing a high oxygen content gas to an ozone generator to produce ozone;
    b) passing said ozone to a contact tank at atmospheric pressure to produce an oxygenated and ozonated liquid;
    c) passing said oxygenated and ozonated liquid in a contacting loop of an in-line supersonic mixer to produce a substantially pure supersaturated oxygenated and ozonated liquid; and
    d) filling and capping said substantially pure supersaturated oxygenated and ozonated liquid into a bottle.

12. The method of claim 11 further comprising lowering the pressure to facilitate the release of supersaturated oxygen from said substantially pure oxygenated and ozonated liquid after step (c) thereof.

13. The method of claim 11 further comprising pressure filling said substantially pure supersaturated oxygenated and ozonated liquid by maintaining the liquid level and preventing air from escaping from said bottle.

14. The method of claim 11 further comprising applying counter pressure using oxygen or ozone to said bottle prior to filling to evacuate air from said bottle.

15. The method of claim 11 wherein said high oxygen content gas is pure oxygen.

16. The method of claim 11 which further comprises decomposing said ozonated liquid to oxygen and liquid.

17. The method of claim 16 which comprises adding oxygen to said liquid to supersaturate the ozonated liquid.

18. The method of claim 11 wherein step (c) thereof further comprises passing oxygenated and ozonated liquid mixture in said contacting loop of said in-line supersonic mixer takes place in a centrifugal pump to increase the pressure of the liquid to from about 50 to about 90 psig at a rate of from about 25 to about 75 gallons per minute.

19. The method of claim 11 further comprises adding refrigeration to said contact tank.

20. The method of claim 11 further comprises recycling said substantially pure supersaturated oxygenated and ozonated water to said contact tank.

21. The method of claim 11 which comprises accelerating said oxygenated and ozonated liquid to supersonic speed.

22. The method of claim 18 which comprises forming gas bubbles to reduce the sound velocity to less than about 50 ft/sec in a two-phase flow, and further reducing said gas bubbles to microscopic sizes.

23. The method of claim 11 wherein said liquid is water.

* * * * *